United States Patent [19]

Strand

[11] 4,241,238
[45] Dec. 23, 1980

[54] TELEPHONE NUMBER MEMORY AND INDICATOR SYSTEM

[75] Inventor: Thomas J. Strand, Crowborough, England

[73] Assignee: Feedback Limited, Sussex, England

[21] Appl. No.: 26,966

[22] Filed: Apr. 4, 1979

[30] Foreign Application Priority Data

Apr. 20, 1978 [GB] United Kingdom ............... 15686/78

[51] Int. Cl.$^3$ ............................................ H04M 15/06
[52] U.S. Cl. ........................................................ 179/5.5
[58] Field of Search ............. 179/5.5, 18 FH, 27 DB, 179/6 R, 6 E, 2 A, 2 DP, 90 AN, 84 C

[56] References Cited

U.S. PATENT DOCUMENTS

| 3,727,003 | 4/1973 | Paraskevakos | 179/5.5 |
| 3,904,830 | 9/1975 | Every, Sr. et al. | 179/5.5 |
| 4,121,052 | 10/1978 | Richard | 179/90 AN |

FOREIGN PATENT DOCUMENTS 1536843 12/1978 United Kingdom ..................... 179/5.5

Primary Examiner—Raymond F. Cardillo, Jr.
Assistant Examiner—Joseph A. Popek
Attorney, Agent, or Firm—Dowell & Dowell

[57] ABSTRACT

A telephone number memory and indicator system which allows a caller to leave his number when the person to whom he is calling is absent. The system includes an automatic answering system which detects a ringing signal and intercepts the call after a predetermined time. On interception a proceed signal is generated by generator which indicates to the caller, or to elements within his telephone, that the system is ready to receive his number data. This data when transmitted is detected by detectors within the system and stored in store for future recall.

23 Claims, 7 Drawing Figures

TELEPHONE NUMBER MEMORY AND INDICATOR SYSTEM

BACKGROUND OF THE INVENTION

The invention relates to a telephone number memory and indicator system. There is already in existence a wide range of units which automatically answer incoming calls to a telephone to enable users to leave a spoken message which is recorded on magnetic tape. This is replayed later at the convenience of the user. Ex-directory numbers may utilize answering devices which announce their presence by a short tone which is transmitted to the caller.

However, even the most simple of these known units is somewhat mechanical in nature, relying on tape loops or cassettes which inevitably in the longer term will require servicing and/or replacement.

The invention is concerned with providing a simple and reliable means of leaving a telephone number at a remote location.

SUMMARY OF THE INVENTION

According to the invention there is provided a telephone number memory and indicator system comprising means for detecting a ringing signal and for intercepting the call after a predetermined ringing period; generator means for generating a proceed signal indicative that the system is ready to receive incoming data; detector means for detecting incoming data indicative of a callers telephone number; electronic storage means for storing the detected data; and indicator means capable of displaying a number present in said storage means.

BRIEF DESCRIPTION OF DRAWINGS

The invention will now be described by way of example with reference to the accompanying drawings in which.

DESCRIPTION OF PREFERRED EMBODIMENTS

Figure 1:
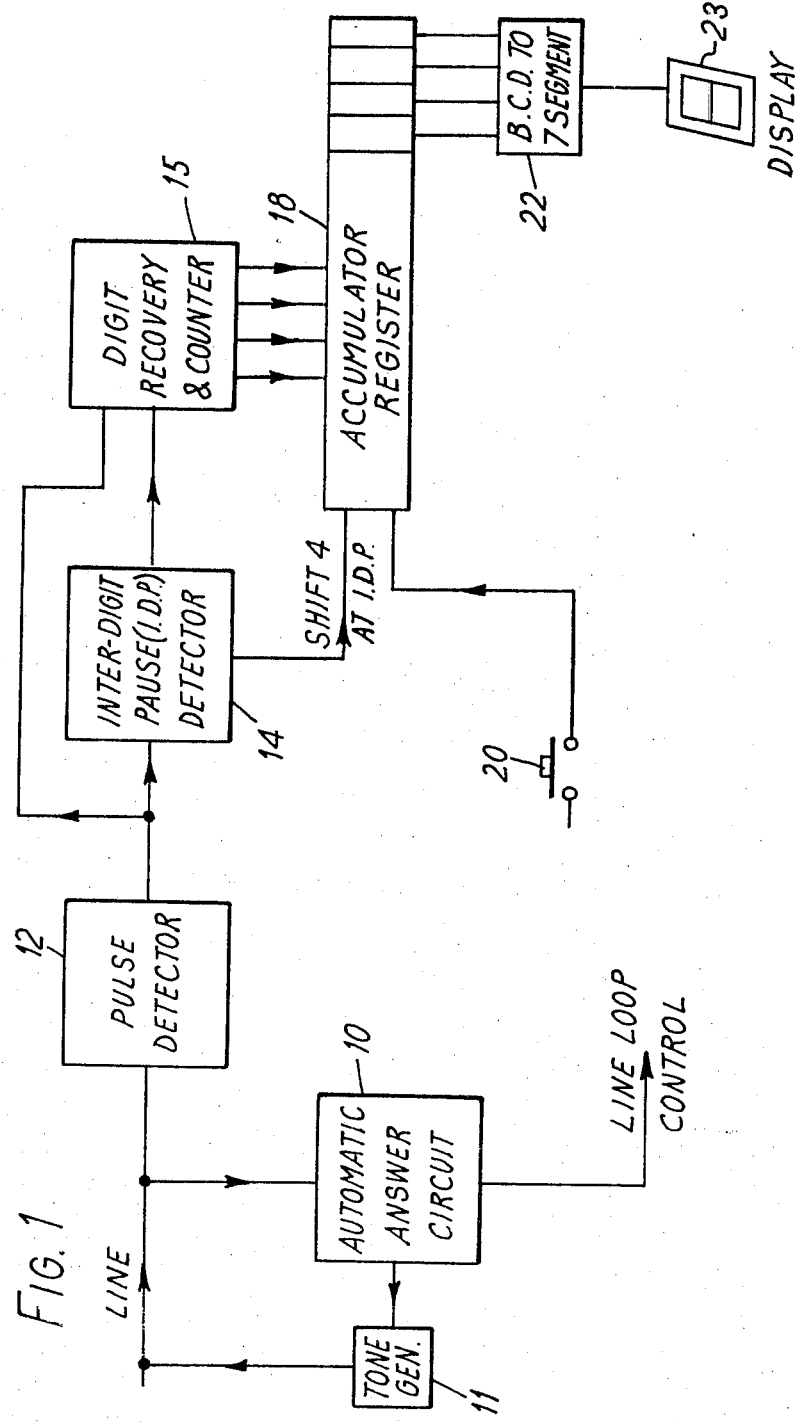
FIG. 1 shows one arrangement for providing the number indicator system of the invention with single digit display.

The system of FIG. 1 includes an automatic answering circuit 10 connected to the telephone line. This answer circuit 10 detects the ringing current in known manner when applied to the particular telephone by the exchange. After a predetermined suitable period, up to 12 seconds for example, the circuit 10 will cause the line to be looped thereby effectively answering the call. A short announcement tone generated by a tone generator 11 is then transmitted to the caller. This indicates to the caller that the system is ready to receive his own telephone number which he commences to dial on his own telephone. The loop disconnect pulses caused by this dialing operation appear as a 10 pps stream at the input of a pulse detector 12 which translates these pulses into a noise free stream suitable for processing and being isolated from the line. The pulse stream from detector 12 is received by an inter-digit pause detector 14 and a counter block 15.

Each transmitted digit of the extension number is separated by a defined period, known as the inter-digit pause (i.d.p.). This is detected by detector 14 and used to separate the digits from each other, indicate the presence of digits and indicate the end of the transmitted number and is used to control the digit recovery and counter block 15.

This receives the incoming pulse stream gated under the control of the inter-digit pause detector 14 and counts the digit pulses corresponding to the transmitted number. When the digit is complete it is written into an accumulator register 18 and shifted 4 bits along in the inter-digit pause under the control of detector 14. The register 18 is then ready for the next digit being received.

As each digit is entered and shifted in the register 18, the transmitted number is accumulated digit by digit. Once a complete number has been accumulated the caller will release the line. If required the presence of a number in the register could disable the answer circuit so that the data is not over-written or corrupted by a further incoming call when the system has a capacity of storing only one caller's number.

A view display key 20 is provided to recall the stored number when the person absent returns. The number in the register will be decoded by a b.c.d. to 7 segment converter 22 and displayed in display 23. The word in the right hand end four bits may if required be set to hexa-decimal C at the beginning of a call to indicate via the display that a number has been received and is stored waiting to be viewed. Each time the View Display Key is depressed a four bit shift of the register is effected via a clock generator (not shown). Each four bit shift moves the digits one place along the register. The display therefore indicates the stored digits in the order in which they were received. Each operation of the key 20 brings up the next digit in the stored number. When the number is complete, the accumulator register is empty, ready for the next call. The operator may then if he wishes dial the number which has been displayed.

The construction and function of several of the various circuit elements will now be described in more detail.

The automatic answer circuit 10 uses elements of conventional design. Ringing current applied to the associated telephone bell is detected by an isolating circuit, either capacitively, inductively or optically coupled to the unit circuitry. The actual connection may be either in series with the telephone bell, which is preferred, or in parallel with the incoming exchange line. The duration of the ringing is determined by the following means within the circuit block 10. A bistable circuit is set by a timing circuit, and reset by any pulses corresponding to the ringing current. After a short time t, (about 2 seconds for example) the bistable is tested to see if it has been reset. If it has, a counter is incremented, if it is not the counter, if not empty, is decremented. When the counter reaches a value n, this indicates that the ringing has continued for n,t, seconds. This has the advantage that the counting and timing is independent of the format of the ringing current, and within an accuracy interval t, will always operate in n,t,. For manual exchanges where only one burst of ringing is used, n, may be reduced accordingly.

Having detected that the required period of ringing has been applied to its input, the unit applies a suitable terminating impedance to the exchange line. This has the correct d.c. and a.c. characteristic required by the exchange, and/or PTT authority under whose jurisdication the unit is operating.

Having been gated by the answer circuit 10, the announcement tone is then transmitted from the tone generator 11, at a level and frequency required. If no data is received or after a suitable time period, the tone will cease, and then at a later time, if no data is received, the circuit will unloop the line and return to its quiescent state. It is then ready for the next call.

The tone generator 11 is of conventional design either in the form of a linear oscillator or relaxation type. Its output, if necessary, being filtered to reduce the spurious harmonics transmitted to line. Alternatively the source can be a digital synthesiser using a truncated triangular staircase with suitable filtering to approximate to a sinusoidal output.

Its level and frequency are preset to that required by the regulations governing its operation, but will normally be in the range 300 to 3400 Hz, and −9 to −35 dBm. The output of the oscillator is gated by the automatic answering circuit to enable the tone to be transmitted at the requisite times during data reception.

The pulse detector 12 is chosen to meet the bandwidth and gain requirements suitable to pass the residue of the loop disconnect pulses generated by the caller's dial. These may consist of bipolar transient signals corresponding to the mark and space of the digit stream. At each transient, a timer circuit within detector 12 is interrogated and initialized. Thus the period between pulses can be determined to ascertain whether it is a mark, space or a complete digit. Obviously a digit must be given the same counting as a mark and a space.

The format at the input of inter digit pause detector 14 is such that there is a stream of pulses, which correspond to the dialled digit, and then a pause. This pause is largely determined by the dialling system and is required by the exchange to determine the gap between successive digits. The timer used in the pause detector may therefore be used to indicate the pause because of its longer duration. Each time an inter digit pause occurs, the number counted by the digit recovery system is transferred to the accumulator and shifted one hexadecimal digit up the accumulator.

As described above the pulse detector gives an output corresponding to the mark/space input from the dial. Each digit, or mark and space, causes the counter within digit recovery and counter block 15 to increment. When the inter digit pause detector gives an output, the contents of the counter are written into the accumulator register and the counter cleared, ready for the next block of digits.

In the system of FIG. 1 the number digits are presented serially and must be remembered before dialling or recalled during the dialling process. In the modified system of FIG. 2 all the digits may be displayed simultaneously.

An expanded decoder 28 is provided for N digit display 29. Instead of a serial display, each of the N digits is decoded in decoder 28 and displayed on the N digit display 29. Thus the complete stored number is displayed. The decoder and display may be multiplexed as necessary.

The view display key 20 may also be used to clear the accumulator register, ready for the next call.

Whereas in the FIG. 1 arrangement where the first digit of the number was in the right hand end of the register and displayed first, this must be reversed so that the last received digit is displayed in the right hand digit. The number therefore appears in the display as it would in a directory.

Figure 2:
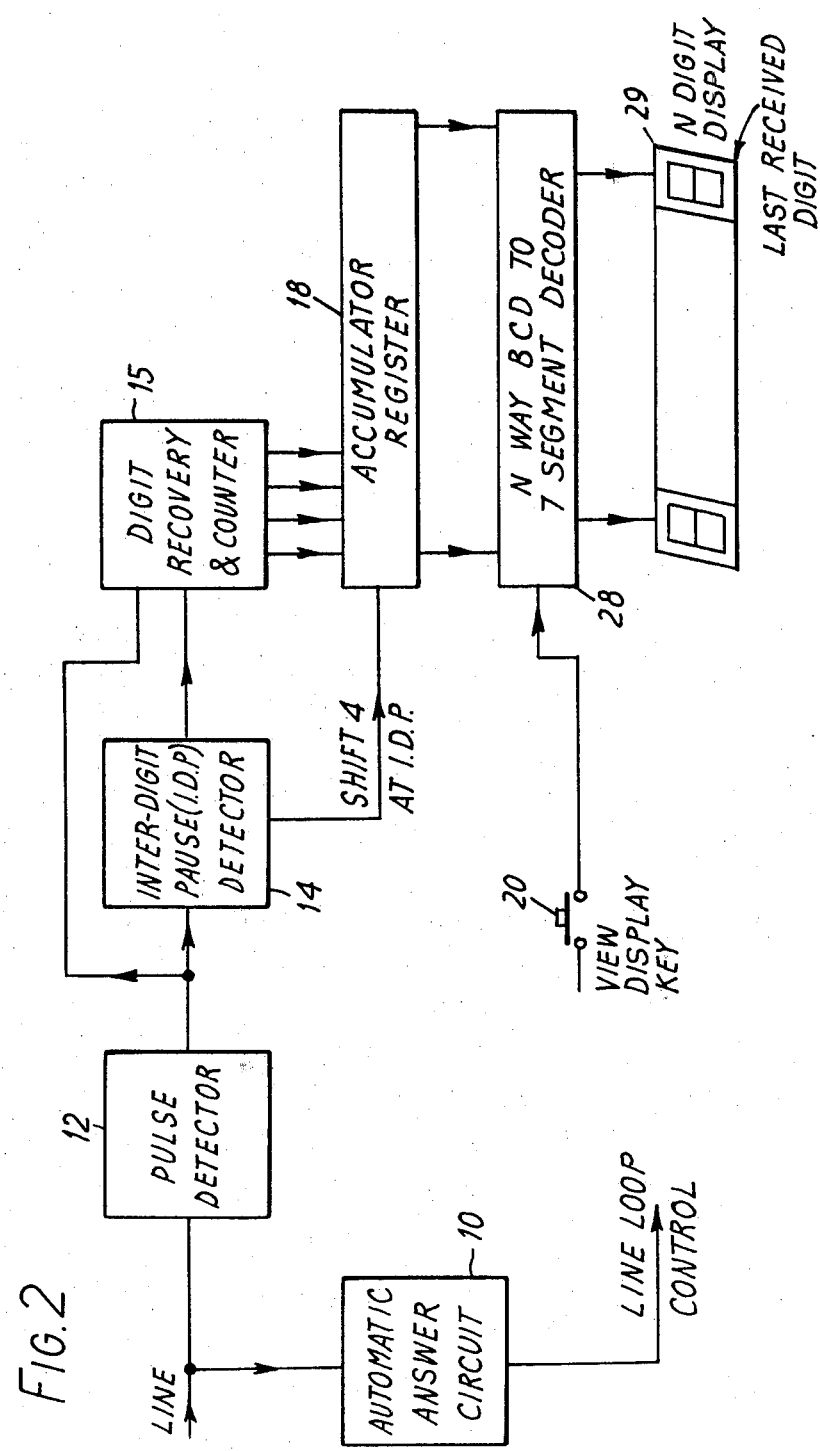
FIG. 2 shows a second embodiment with N digit display.
Figure 3:
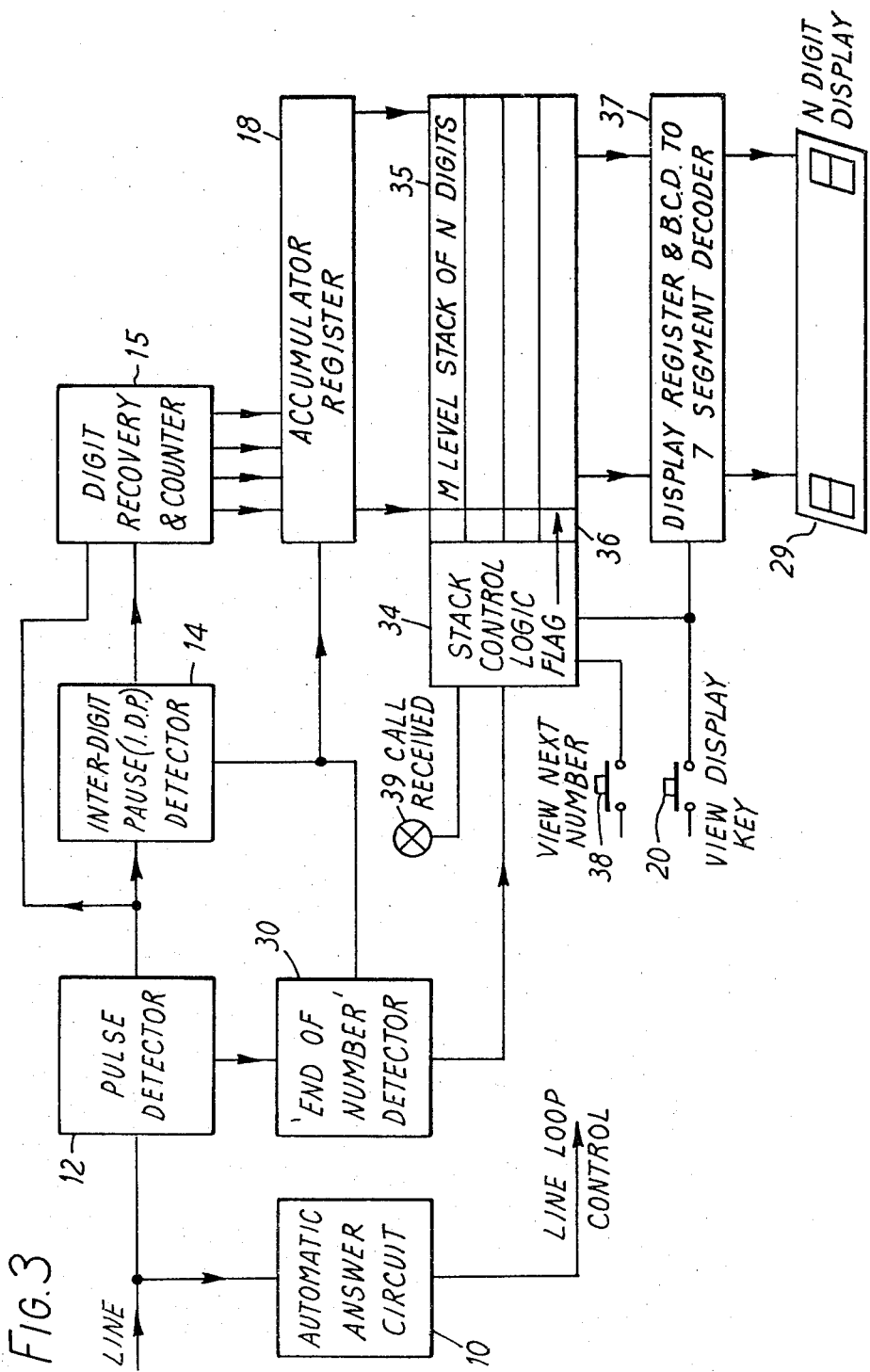
FIG. 3 shows an expanded system for retaining numbers from several callers.

The arrangement of FIG. 2 can be expanded to allow the numbers from several callers to be accomodated. Such a system is shown in FIG. 3 and includes an additional register 35 in the form of a stack register together with associated control logic block 34.

This has the capability of storing M numbers each of N digits. Each number is received in the same manner as described above but when the complete number has been accumulated it is written into the bottom of the register stack 35. The end of the number is detected by detector 30 to enable the stack control logic block 34. The successive callers' numbers cause the previous caller's number to be raised one complete location. A flat digit is used to indicate that a number is present in the stack. This causes an indication 'call received' to be received by indicator 39. The contents of each stack level may be sequentially written into a display register 37 under the control of a 'view next number' key 38 rotating the stack contents by one location to enable it to be displayed via the B.C.D. to 7 segment decoder and display 29. The number is displayed by depressing display key 20. The stack register 35 may be several registers arranged in stack form or alternatively a long serial register or addresses in RAM storage (Random Access Memory). An inhibitor could be provided to inhibit the answer circuit if the stack has become full.

Certain groups of digits may be used to provide other functions within the unit. One application of this is to use specific groups not found in normal data e.g. the first two digits of a group being 10 can be used to indicate that the following digits form an extension number to the previous digit group. These specific data groups are decoded and modified prior to insertion into the memory stack.

The use of multiple groups of digits is affected by the repeated use of the 'message proceed' tone. In this case, once data has been received and accepted the 'message proceed' tone is retransmitted to the caller. This indicates that the previous data has been accepted and the unit is ready for further data.

If necessary, a different tone could be generated to perform the same action.

Tone generator 11 (see FIg. 1) can be expanded to perform this additional requirement when triggered.

With regard to the operation of detector 30, the timer mentioned above in relation to the inter digits pause detector 14 of FIG. 1, can also be interrogated for an upper limit, which if it is reached indicates that there is no more data and that the reception is complete. This 'end of number' situation can be used by detector 30 to cause any non-zero contents of the digit recovery counter to be shifted to the accumulator and then the entire contents of the accumulator are loaded into the stack.

Stack control block 34 controls the location of the data stored in the memory and inserts and removes guard characters as necessary. As just mentioned if the first two digits in a group are 10 (hexadecimal A) then they are replaced by a single digit, hexadecimal E. This, when required, is displayed after the previous number in the right hand digit and then again with the next number in the left hand digit. Thus, if two numbers are received, the second of which is prefixed with two 10s, then the logic interprets this as an extension number to the first, and displays it accordingly.

In practice stack control is also connected to answer circuit 10 so that if the stack is full, the stack control 34 inhibits the automatic answering circuit so that it will not loop the line, or inhibit the repeated message proceed tone so that no further data can be received.

Figure 4:
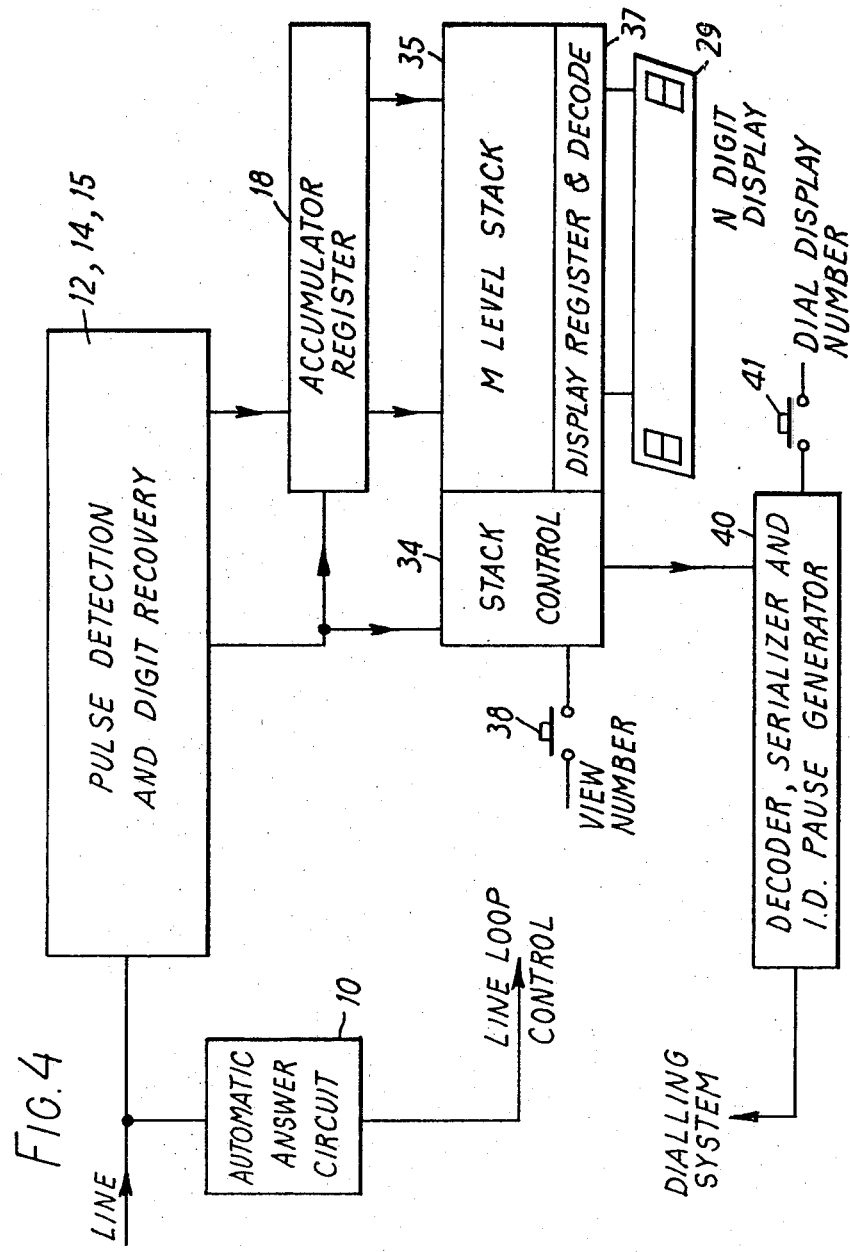
FIG. 4 shows an arrangement similar to FIG. 3 but including a dialing system for the displayed number.

The arrangement of FIG. 4 shows the addition of a dialing block 40 which receives from the register, the number data corresponding to that displayed by display 29 and decodes and serializes the data into suitable form for effecting dialing including the generation of inter digit pauses to drive the loop disconnect circuitry. A switch 41 initiates the dialing sequence. Thus having lifted the handset and on depressing the switch 41, the previously stored number now displayed is automatically dialed to return the call. It is to be noted that this number has been generated in response to an earlier externally generated call, and is not to be confused with systems merely holding commonly used telephone numbers in a data bank (directory list) which can be accessed for automatic dialling.

Figure 5:
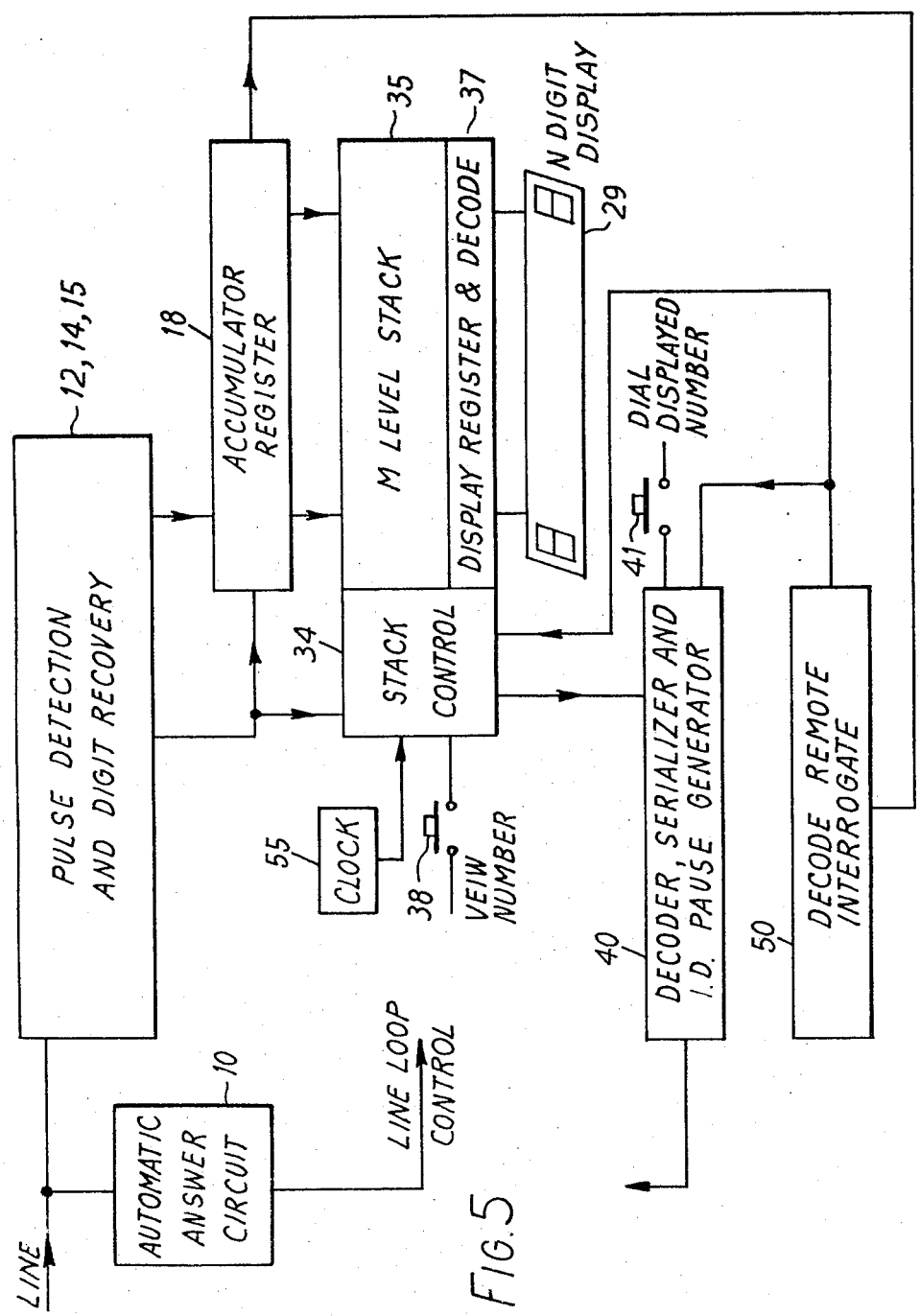
FIG. 5 shows the provision of a remote interrogation system to allow stored numbers to be accessed from another telephone.

A further refinement suitable for a fully integrated system of telephones is shown in FIG. 5. A remote interrogation unit 50 is provided connected to the register 18, dialing block 40 and stack control 34. This system allows a remote user to interrogate the store to receive data relating to its contents. This is effected by the remote user dialing in to this telephone and when the tone is heard indicating that the system is ready to receive the caller's number, instead of dialing that number the caller dials a preselected code which is received by register 18 in the normal way and if this special code is detected then unit 50 will initiate the read out of any numbers held in the stack register. The numbers may for example be transmitted in the usual dial pulse/loop disconnect form and a similar register/display system can be provided at the callers end to receive and provide visual indication of the numbers received. Thus a user may dial his own telephone and on connection dial the code and check if any numbers have been left for him.

Another facility which may be incorporated is to use the unit in its quiescent state as a digital clock giving a suitable display to the user. Thus a clock generator 55 providing time information can use display 29 to provide time indication via control 34 and decoder 37. An extension of this is to automatically store the time when data is stored in the course of normal operation. The time record will be stored along with the telephone number data to advise the user of the time at which the call was received. The display can be expanded to provide indication of both number and time simultaneously or can be suitably switched to provide sequential indication of number followed by the time.

Figure 6:
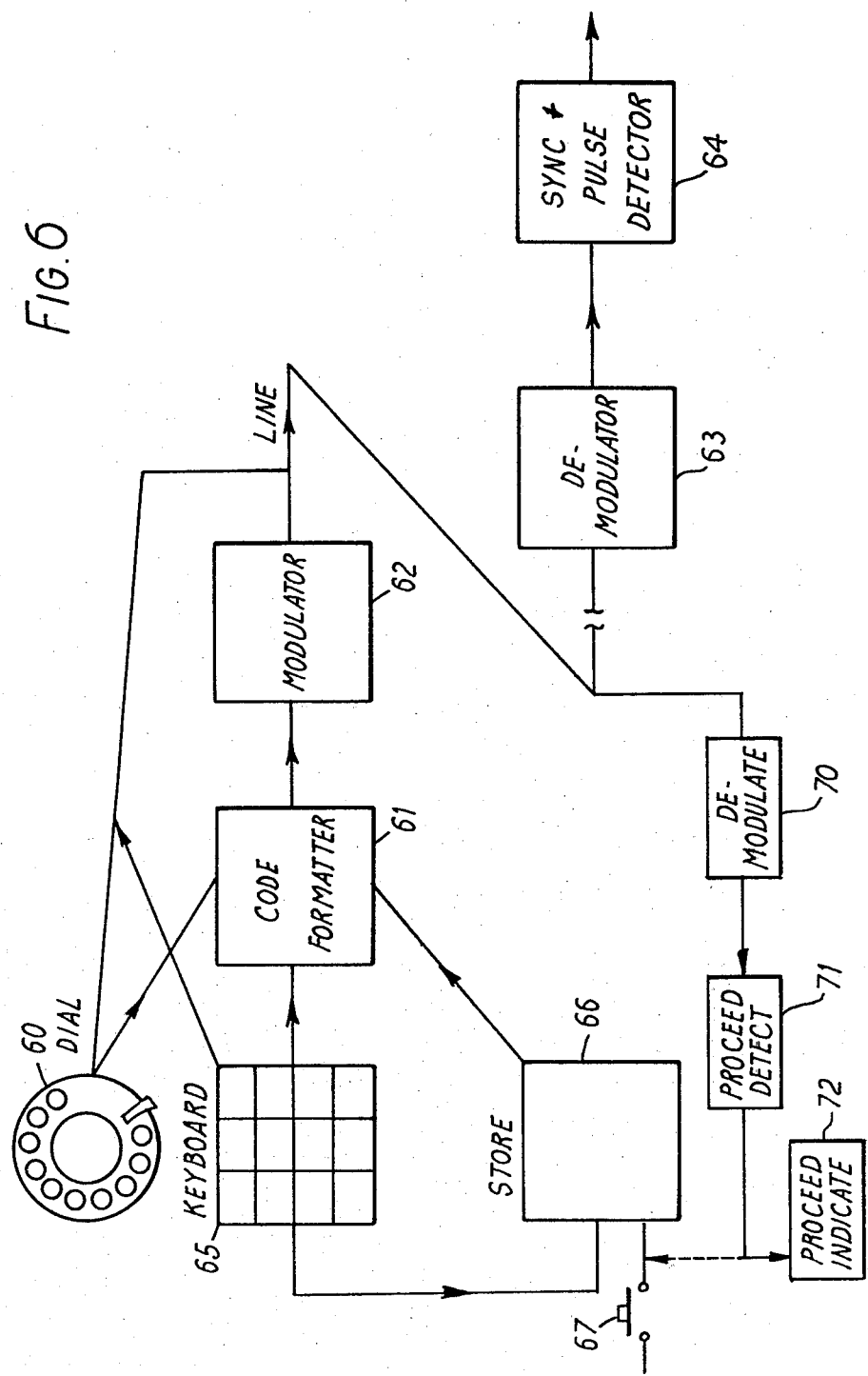
FIG. 6 shows alternative dialing arrangements.

Although the systems described in FIGS. 1 to 5 have been described as being activated by simple dialing this need not be the only way of transmitting the data. FIG. 6 shows various alternative transmission and receception configurations.

As explained for simple dialing, the user dials his own number using telephone dial 60. The loop disconnect pulses caused by the dialing operation appear as a 10 pps stream at the input of the pulse detector at the receiving end.

There may be certain cases however where the use of loop disconnect pulses may be precluded due to other constraints within the exchange system to which the unit is attached. The simplest way to overcome this problem is to provide a very simple switch for the caller which will modify the loop disconnect pulses so that they can be transmitted as a pulse stream, either voltage or current, which is of insufficient magnitude to effect the exchange equipment, and of such a character to be able to be transmitted to the remote equipment.

There may be other instances where even 'modified' dial pulses or loop disconnect pulses cannot be used. In these cases, a system using modulation techniques must be used.

When using modulation techniques information from the dial may be routed through a code formatter 61 to a modulator 62 as shown. The code formatter assembles the digit pulse stream into a form more suitable for transmission e.g. binary coded decimal (b.c.d.) and inserts a synchronizing pulse. The output pulse stream is then used to modulate a suitable carrier wave whose fundamental is in the audio band of frequencies. The means of modulation is not restricted, amplitude modulation (AM), double sideband, with and without carrier, freqency modulation (FM), frequency shift keyed (FSK) systems or others may be used.

Where such a modulation system is used a compatible demodulator 63 is provided at the receiving end to recover the pulse stream. The pulse detector 64 would then have to remove the synchronising pulse and generate the correct data format for the digit recovery system.

Also shown in FIG. 6 is a keyboard 65. In order to be compatible with certain exchanges, it may be necessary or cesirable to use a keyboard rather than a dial. Also the caller's number could be stored for simple single action recall using a store 66 under the control of switch 67. In the simplest case the store would be a switch array or diode matrix. In further units part of the number store could be utilized. Thus when the tone is heard from the receiving end to indicate that the number be entered, by simply pressing switch 67 the callers number would be automatically relayed.

Although the system has been described as relating to telephone 'numbers' this is meant to include straightforward numbers or alpha-numeric or other characters.

Although the display has been discussed in relation to visual displays it would be possible to display the telephone number data in other forms for example tactile recognition arrangements for blind or partially sighted persons (e.g. a keyboard).

Although the indication given to a caller that he must dial in his number has been described as comprising an audible tone, other audible indications could be provided.

Although the device has been discussed where the caller leaves his number, the caller can leave any other number, which other number could be the number of a telephone where he can be reached later.

As stated previously, telephone regulations in certain countries normally require an answering unit to give a verbal announcement of their presence. An extension of the schemes described above is a system which obviates the need for such an announcement.

If the caller and receiver telephones are suitably adapted to provide acknowledgement of the others presence then the system can automatically perform an identification procedure.

On embodiment as shown in FIG. 6 which utilises the 'message-proceed' tone which is modulated or categorised to enable the receive unit to advise the caller unit of its presence.

This is effected by blocks 70–72. The modulated 'message proceed' tone is received by the calling unit and passes via demodulator 70 to detector 71. The proceed detector will detect the predetermined format signal and when such signal is detected will produce an enabling signal to actuate indicator 72. Proceed indicator 72 may be a separate indicator or use can be made of any display already present which can be addressed to form a unique indication by which the caller can see that his telephone number data is now required. Also (or alternatively) the enabling signal from detector 71 may be used to automatically actuate the store 66 to generate the data indicative of the callers number.

Suitable responses for proceed indicator block 72 include the following:

(a) lighting of a signal lamp to advise the caller unit that a receiver unit is available and ready to receive the number of the caller.
(b) as (a) but using a digit or digits in the display
(c) as (b) but to use the display to advise the operator of the appropriate action, i.e. that the display would show an instruction such as 'dial your number', or an abbreviation of such an instruction.

It is also possible that the data could be checked for errors and corrected if necessary, again automatically. These functions would take place at speeds comparable to, or greater than, that achieved manually.

Again with reference to the 'message proceed' tone, its duration may be limited by one of several constraints within the system.

Primarily the tone would terminate after a given time period dictated by the PTT regulations under which the unit is functioning. In addition to this, and to facilitate operation, the tone is interrupted by the arrival of the incoming data stream. This means that the caller does not have to wait for the end of the tone before proceeding with the data.

Although the generator 11 associated with the automatic answer circuit 10 has generally been described as providing a proceed tone, alternatively the generator can be a unit for generating synthesised speech using digital electronic techniques.

The basic system described could be constructed using hard-wired discrete logic packages and conventional manufacturing techniques using active and passive components. However to keep costs down the logical functions, at least, could be implemented using either large scale integrated circuit (LSI) either proprietary or custom designed. This would enable construction to be simple, low cost and with reduced test and assembly time.

Figure 7:
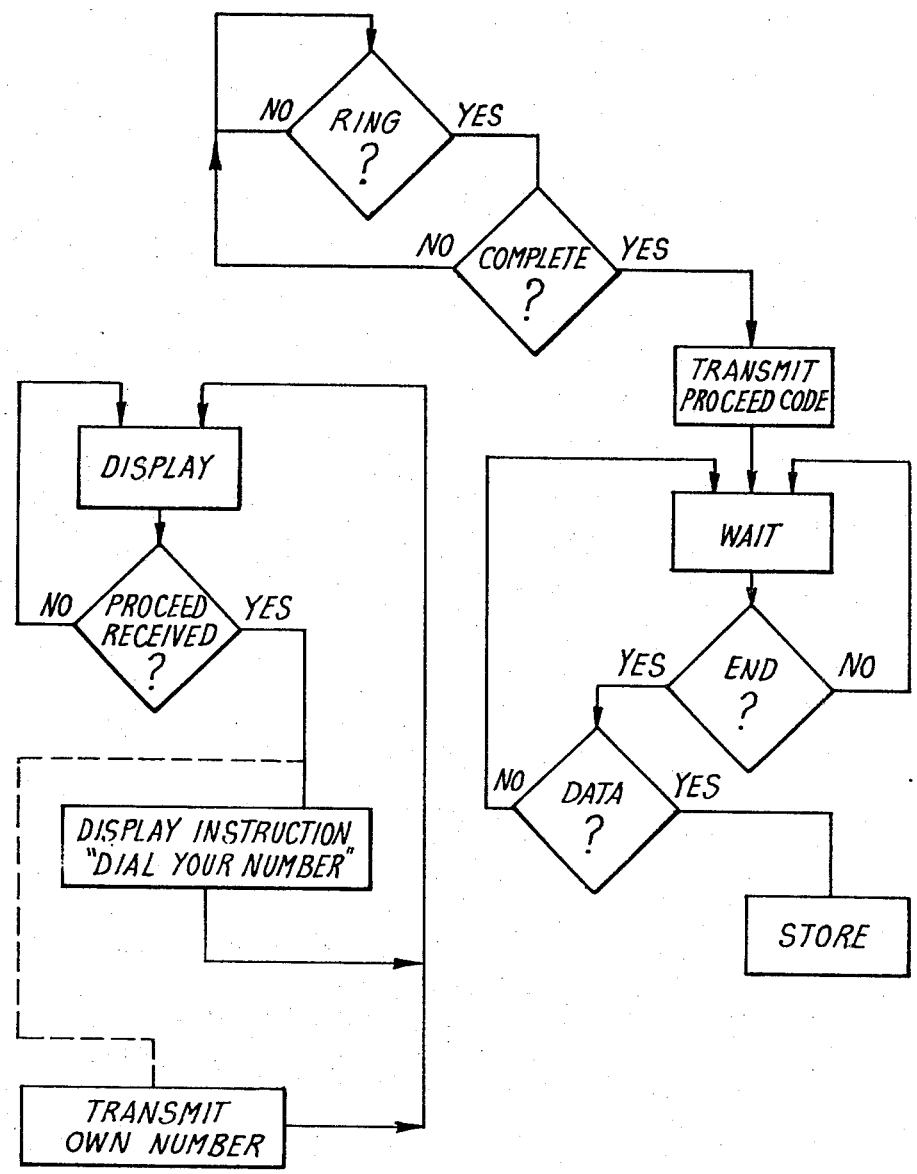
FIG. 7 shows flow charts associated with a microprocessor based system.

Alternatively, it would be possible to use microprocessor technology to perform the functions within the unit. A flow chart suitable for a microprocessor based system is shown in FIG. 7.

Power for the device may be derived from the mains supply, primary or secondary cells or in certain cases from the telephone line or equipment to which the unit is attached.

I claim:

1. A telephone number memory and indicator system suitable for installation on conventional telephone networks comprising:
    answering means adapted to measure the duration of each input signal for detecting a ringing signal having a duration falling within a predetermined period as received from the exchange in response to a calling party and for intercepting a call after a predetermined number of ringing signals have been detected to allow the exchange to determine that the call has been intercepted;
    generator means for generating a proceed signal in response to the output of said answering means for transmitting to the calling party's line that the system is ready to receive incoming data;
    detector means for detecting incoming telephone number data received from the calling party's telephone line after the call has been intercepted;
    electronic storage means for storing the detected data from said detector means; and
    indicator means capable of providing a display indicative of at least a portion of the data present in said storage means.

2. A system according to claim 1, wherein signal generator means are provided to automatically output to the telephone line stored telephone number data from said storage means.

3. A system according to claim 2, wherein interrogation means are provided connected to said signal generator means to allow data indicative of a stored number previously received to be transmitted to a remote location on receipt of a predetermined signal from a calling party via the detector means.

4. a system according to claim 1, wherein memory means and signal generator means are provided associated with the calling party's telephone to provide automatic transmission of the telephone number data for receipt and storage by the electronic storage means associated with the called party's telephone.

5. A system according to claim 1, wherein proceed detector means are provided associated with the calling party's telephone responsive to the proceed signal and capable of providing an indication to the calling party that the telephone number data is required.

6. A system according to claim 4, wherein proceed detector means are provided associated with the calling party's telephone responsive to the proceed signal to automatically output the telephone number within the memory means on receipt of the proceed signal.

7. A system according to claim 1, wherein electronic time indication means are provided to supply data indicative of a time a call is received for storage with the number data in said storage means.

8. A system according to claim 1, wherein the detector means for detecting incoming number data comprises a pulse detector for detecting a signal stream associated with each digit of the incoming number, a pause detector for detecting any pause between digits to separate each digit, counter means for receiving the detected pulses from the pulse detector pertaining to the signal stream, the contents within said counter means being transferred to the storage means under the control of said pause detector.

9. A system according to claim 1,
    wherein said indicator means comprises a visual display for displaying the number data via a decoder.

10. A system according to claim 1, wherein said storage means include a number of data stores capable of storing numbers from a plurality of calling parties and control means for selecting which of the data stores is used to store the incoming data.

11. A system according to claim 10, wherein termination detector means responsive to the output of said detector means are provided to determine when the end of the data stream has occurred to allow the control means to insert identification data into the store to accompany the number data to indicate on read out that the immediately following data is to be interpreted as an extension number.

12. A system according to claim 1, wherein the detector means is capable of receiving and detecting data signals generated by the equivalent of dialling.

13. A system according to claim 1, wherein the detector means includes a demodulator to allow modulated data signals to be detected.

14. A system according to claim 1, wherein the generator means is adapted to provide synthesised speech signals for transmission to the calling party's line.

15. A telephone number memory and indicator system suitable for installation on conventional telephone networks comprising:

answering means adapted to measure the duration of each input signal for detecting a ringing signal having a duration falling within a predetermined period as received from the exchange in response to a calling party and for intercepting a call after a predetermined number of ringing signals have been detected to allow the exchange to determine that the call has been intercepted;

generator means for generating a proceed signal in response to the output of said answering means for transmission to the calling party's line that the system is ready to receive incoming data and for generating a signal at the end of the received data stream for transmission to the calling party's line to indicate that the data has been correctly received;

detector means for detecting incoming telephone number data received from the calling party's telephone line after the call has been intercepted;

electronic storage means for storing the detected data from said detector means; and indicator means capable of providing a display indicative of at least a portion of the data present in said storage means.

16. A system according to claim 15, wherein the storage means includes a data store capable of storing a plurality of detected data streams and control means for controlling said data store in dependence on the output of said detector means to allow further received data streams to be stored by said data store.

17. A system according to claim 16, wherein the control means is adapted to allow further received data streams following the signal generated by said generator means, after receipt of the earlier data stream, to be stored as an extension number by said data store.

18. A system according to claim 16, wherein the control means is adapted to provide identification data for storage along with the telephone number data to provide visual indication via the display means that telephone number data is present in said storage means.

19. A system according to claim 17, wherein the control means is adapted to provide identification data for storage along with the telephone number data to provide an indication on display that the data thereafter represents an extension number.

20. A system according to claim 16, wherein the control means is adapted to sequentially load each location of the data store with data to provide maximum use of storage capacity available.

21. A system according to claim 20, wherein the control means is adapted to inhibit the answer means when the number of unused locations within the storage means is insufficient to store a further number data sequence.

22. A system according to claim 15, wherein the generator means is adapted to provide an audible signal for transmission to the calling party prior to and after receipt of the data.

23. A system according to claim 16, wherein the data store is adapted to be capable of receiving a data stream which contains data in addition to telephone number data.

* * * * *